(12) United States Patent
Onishi

(10) Patent No.: US 7,473,733 B2
(45) Date of Patent: Jan. 6, 2009

(54) CATIONIC GRAFT-COPOLYMER FOR NON-VIRAL GENE DELIVERY VECTOR

(76) Inventor: Yasuhiko Onishi, 39-4, Kosora-cho, Seto-shi, Aichi 489-0842 (JP)

( * ) Notice: Subject to any disclaimer, the term of this patent is extended or adjusted under 35 U.S.C. 154(b) by 349 days.

(21) Appl. No.: 10/536,901

(22) PCT Filed: Jan. 8, 2004

(86) PCT No.: PCT/JP2004/000086
§ 371 (c)(1), (2), (4) Date: May 27, 2005

(87) PCT Pub. No.: WO2004/065440
PCT Pub. Date: Aug. 5, 2004

(65) Prior Publication Data
US 2005/0287110 A1    Dec. 29, 2005

(30) Foreign Application Priority Data
Jan. 17, 2003   (JP)   ............... 2003-045163
Sep. 12, 2003   (JP)   ............... 2003-320541
Dec. 26, 2003   (JP)   ............... 2003-434851

(51) Int. Cl.
A61K 47/48  (2006.01)
A61K 31/74  (2006.01)
C08G 63/48  (2006.01)
C08G 63/91  (2006.01)

(52) U.S. Cl. ................... 525/54.2; 424/78.3

(58) Field of Classification Search ............... 525/54.2; 424/78.3
See application file for complete search history.

(56) References Cited

U.S. PATENT DOCUMENTS

| | | | |
|---|---|---|---|
| 3,989,656 A | | 11/1976 | Kamiya et al. |
| 4,032,488 A | | 6/1977 | Hokkoku et al. |
| 4,808,709 A | | 2/1989 | Onishi |
| 4,816,540 A | | 3/1989 | Onishi |
| 5,834,556 A | * | 11/1998 | Desai et al. ............... 525/54.1 |
| 5,859,128 A | * | 1/1999 | Moffett ...................... 525/54.2 |
| 6,060,566 A | | 5/2000 | Lorencak et al. |
| 6,645,525 B1 | * | 11/2003 | Woiszwillo ................. 424/460 |
| 7,166,671 B2 | * | 1/2007 | Wood et al. ................ 525/54.2 |
| 2002/0161136 A1 | * | 10/2002 | Gevaert et al. ............. 525/450 |
| 2003/0148979 A1 | * | 8/2003 | Sosnowski et al. .......... 514/44 |
| 2003/0152548 A1 | * | 8/2003 | Mikos et al. ............. 424/78.26 |
| 2003/0203000 A1 | * | 10/2003 | Schwarz et al. ............. 424/423 |
| 2004/0058446 A1 | * | 3/2004 | Wolff et al. ................. 435/455 |
| 2004/0067196 A1 | * | 4/2004 | Brunke et al. .............. 424/1.49 |
| 2004/0142474 A1 | * | 7/2004 | Mahato et al. ............. 435/458 |
| 2004/0157217 A1 | * | 8/2004 | Terlesky et al. ............... 435/6 |
| 2005/0089503 A1 | * | 4/2005 | Li et al. ..................... 424/78.3 |
| 2006/0051315 A1 | * | 3/2006 | Scaria et al. ............. 424/78.17 |
| 2006/0094673 A1 | * | 5/2006 | Chu ............................. 514/44 |
| 2006/0199778 A1 | * | 9/2006 | Ellis-Behnke et al. ......... 514/44 |
| 2007/0041932 A1 | * | 2/2007 | Jeong et al. ................ 424/78.3 |

OTHER PUBLICATIONS

Pack, Daniel W., Gene-Delivery Polymers, 2002, John Wiley and Sons, Inc☐☐http://www.mrw.interscience.wiley.com/emrw/9780471440260/epst/article/pst434/current/html?hd=All%252Cdeae&hd=All%252Cdextran.*

* cited by examiner

*Primary Examiner*—Mark Eashoo
*Assistant Examiner*—Liam J Heincer
(74) *Attorney, Agent, or Firm*—Westerman, Hattori, Daniels & Adrian, LLP.

(57) ABSTRACT

A cationic graft-copolymer for a non-viral gene delivery vector comprising a unit derived from a cationic derivative of a water-soluble linear polymers having a hydroxyl groups, namely, a cationic polysaccharide of the following formula (1) [C6H7O2(OH)3-a (OX)a]x H2O (1) and the cationic derivative of polyvinylalcohol of the following formula (2) or the cationic derivative of the partial hydrolyzed polyvinylalcohol of the following formula (3) [CH2 CH(OH)1-b (OX) b]n (2) [CH2CH(OH)1-b-c (OX)b (OAc)c]n (3) and a unit derived from a polymerizable olefin compound of the following formula (4) R4R6∥-C—C—(4)∥R5 R7(a, x, b, n, c, Ac, X, R4, R5, R6, and R7 are defined in claim 1-6); a process for preparing the same and a transfection reagent made therefrom.

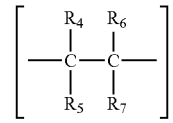

(4)

4 Claims, 2 Drawing Sheets

CATIONIC GRAFT-COPOLYMER FOR NON-VIRAL GENE DELIVERY VECTOR

TECHNICAL FIELD

This invention relates to cationic copolymers for a novel non-viral gene delivery vector that were obtained by graft-polymerizing an olefin monomer onto a cationic derivative of a water-soluble linear polymer having hydroxyl groups.

BACKGROUND ART

It was found, against our expectations, that the cationic copolymers of U.S. Pat. No. 4,816,540 are very effective as a non-viral gene delivery vector.

Recently, in vivo gene delivery has allowed the study of gene expression and function in animal models via insertion of foreign genes or alteration of existing genes and/or their expression patterns. The transfection mechanism between transferred DNA or RNA and a cell has been clearly studied and clinical tests for transfection have become easy to carry out using a viral vector. However, some dangerous adverse effects remain associated with the use of viral vectors. Non-viral gene delivery vectors may be a key technology in circumventing the immunogenicity inherent in viral-mediated gene transfer.

It is expected that non-viral vectors, such as the DEAE-dextran copolymer of this invention (Example 1), will increase safety by minimizing the incidence of serious diseases resulting from the immunogenicity inherent in viral vectors.

The invention of U.S. Pat. No. 4,816,540 provides a novel graft-copolymer that is composed of a cationic derivative of a water-soluble linear polymer and an olefin monomer. The invention described in U.S. Pat. No. 4,816,540 also provides a method of graft-polymerizing an olefin monomer onto a cationic derivative of a water-soluble linear polymer in water using ceric ammonium nitrate to obtain a stable and soap-less latex of the graft-copolymer. Namely, the obtained latex sensitized with an antibody or an antigen is agglutinated using an antigen or an antibody, and it can be confirmed rapidly whether the antigen or the antibody is present. The latex used for the L.A. (Latex Agglutination) test is typically a pure, stable and soapless substance and is also very effective as a non-viral gene delivery vector.

It is shown in U.S. Pat. No. 3,989,656 that a dextran-alkyl methacrylate graft composition is obtained by polymerizing an olefin monomer onto a water-soluble linear polymer, such as dextran, in water using ceric ammonium nitrate.

The present invention provides a novel graft-copolymer for a non-viral gene delivery vector that is composed of a cationic derivative of a water-soluble linear polymer and an olefin monomer.

The present invention also provides a method of graft-polymerizing an olefin monomer onto a cationic derivative of a water-soluble linear polymer in water using ceric ammonium nitrate to obtain a stable and soapless latex of the graft-copolymer, which is very effective as a non-viral gene delivery vector.

DISCLOSURE OF INVENTION

We offer a new class of a polycationic transfection reagent for use as a non-viral gene delivery vector, based on graft-polymerization onto a cationic derivative of a water-soluble linear backbone polymer. The cationic graft-copolymer of this invention is obtained by graft-polymerizing an olefin monomer onto a cationic derivative of a water-soluble linear backbone polymer having hydroxyl groups. This specifically designed molecular structure of the cationic graft-copolymer of this invention ensures easy entry of DNA or RNA into cells via the cationic graft-copolymer-DNA or -RNA complex and endosome buffering.

The high efficiency of the cationic graft-copolymer makes it valuable for gene delivery and gene transfer. A further objective of the invention is to provide a stable and soap-less latex of the cationic graft-copolymer for non-viral gene delivery.

The latex of the invention was effective for identification of an antigen or an antibody by antibody or antigen coating, namely, an immunoassay by analysis of the latex agglutination reaction. The novel latex of the invention was also useful as a paint and a coating material due to its cationic properties. A latex is usually synthesized in the presence of an anionic or nonionic surface active agent to be emulsion-polymerized, but this surface active agent remaining in the latex system is detrimental to the stability of the latex and functions, for example, as an adsorbing power. The novel latex of the cationic graft copolymer of the invention is a stable soap-less type and is prepared by graft-polymerizing an olefin monomer onto a cationic derivative of a water-soluble linear polymer having hydroxyl groups using tetravalent ceric ions in water. The resultant latex having strong adsorbing properties with proteins and nucleic acids, such as DNA and RNA, in its anionic region due to the cationic properties and the hydrophobic domain of the graft-copolymer is able to specifically adsorb proteins or nucleic acids by changing pH and ion strength. The latex of the invention is poured into an organic solvent such as methanol to form a precipitate, which is washed with water, centrifuged, and dried. The graft-copolymer so obtained is also useful as a micro carrier for cell cultivation and immuno-adsorbent assay because of its cationic properties.

BEST MODE FOR CARRYING OUT INVENTION

Figure 1:
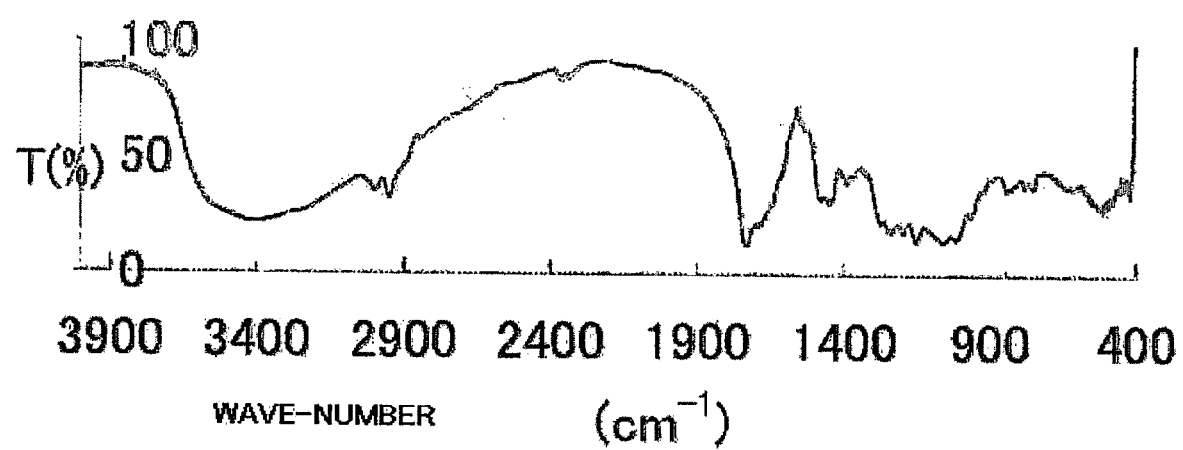
FIG. 1 is a diagram showing the infrared absorption spectra of the complex between the DEAE(2-diethylaminoethyl)-dextran-methyl methacrylate graft copolymer and DNA according to Example 3 of this invention.

The cationic copolymer of this invention can be produced by graft-polymerizing an olefin monomer onto a cationic derivative of a water-soluble linear polymer having hydroxyl groups using a red-ox initiator. The latex of the cationic graft-copolymer is obtained when the above-mentioned graft-polymerization is carried out in water. Simple polysaccharide cationic derivatives which are used here as a water-soluble linear polymer of this invention, such as dextran, pullulan, and dextrin, are comprised of a unit derived from a simple polysaccharide of formula (1).

$$[C_6H_7O_2(OH)_{3-a}(OX)_a]_x H_2O \qquad (1)$$

The polyvinyl alcohol cationic derivative which is used here as a water-soluble linear polymer of this invention is comprised of a unit derived from the polyvinyl alcohol of the following formula (2) or a partial hydrolyzed alcohol of the following formula (3)

  (2)

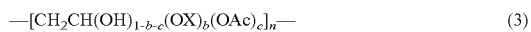  (3)

Wherein X is a —$(CH_2)_m$ $R_1$ organic radical where $R_1$ is a member of the class consisting of —$NH_2$ radical, —$N(CH_3)_2$ radical, —$N(C_2H_5)_2$ radical, —$N^+(C_2H_5)_3$ radical, —$N^+(CH_2)_2CH_2CH(OH)CH_3$ radical, —$N^+(C_2H_5)_2CH_2CH(OH)CH_3$ radical, —$N^+(C_2H_5)_2(C_2H_5)N(C_2H_5)_2$ radical, —$C_6H_4NH_2$ radical, and —$COC_6H_4NH_2$ radical, —$COR_2$ radical where $R_2$ is —$CH_2NH_2$ or —$C_6H_4NH_2$, —$CH_2CH(OH)CH_2R_3$ radical where $R_3$ is —$NH_2$, —$N(CH_3)_2$, —$N(C_2H_5)_2$, and —$N^+(C_2H_5)_3$ radical, m is a natural number of 1 to 3, a is a positive number having a value of $0<a<3$, b is a positive number having a value of $0<b<1$, x and n are natural numbers having a value of 5 or more, $1>b+c$, and Ac is acetyl radical. Other water-soluble linear polymers which are a water-soluble linear polymers having a hydroxyl groups can be used as starting materials besides the above-mentioned polymers. Examples of such other polymers are polyHEMA (2-hydroxyethyl methacrylate), the partial hydrolyzed polyvinyl acetates, and a water-soluble starch etc. These polymers have as a common property that each is a water-soluble linear polymer having a hydroxyl groups, so that their hydroxyl groups can be easily replaced by the above-mentioned cationic groups reacting the chloride of the above-mentioned cationic group (XCl) with their hydroxyl group in the presence of alkali such as sodium hydroxide, potassium hydroxide, and sodium carbonate following Schotten-Baumann Reaction and can easily form a alcohol red-ox system by red-ox initiators to polymerize olefin monomers onto them. Examples of such a red-ox initiator are a tetravalent ceric salt, a tetravalent manganese salt, and a ferric salt-hydrogenperoxide etc.

The polymerize-able olefin monomer is a compound which can form the recurring units shown in the parenthesis in the formula (4) upon polymerization.

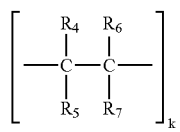  (4)

Wherein $R_4$, $R_5$ and $R_6$ are each selected from the group consisting of hydrogen and $CH_3$ and $R_7$ is a member of the group consisting of

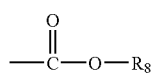

Where $R_8$ is a member of the class consisting of hydrogen, $C_1$-$C_{12}$ alkyl radicals, cyclohexyl radical, $C_1$-$C_4$ hydroxyalkyl radicals, $C_1$-$C_8$ aminoalkyl radicals, $C_1$-$C_8$ dialkylaminoalkyl radicals, glycidyl radical, tetrahydrofuran radical, $C_1$-$C_4$ lower alkyl-substituted tetrahydrofuran radical, benzyl radical, the $(CH_2CH_2O)_y$ $CH_2CH_2OH$ radical where y is a positive integer from 1 to 10, and —$N(R_9)_2$ where the two $R_9$,s which may be the same or different, are either hydrogen or a $C_1$-$C_4$ alkyl radical;

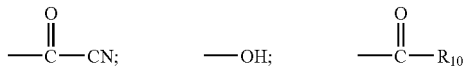

Where $R_{10}$ is a $C_1$-$C_8$ alkyl radical; phenyl radical; tolyl radical; pyridine radical; pyrrolidone radical; and

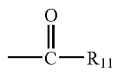

Where $R_{11}$ is $NH_2$ radical, $NHCH_3$ radical, N,N-dimethylamino radical, N,N-dimethylaminopropylamino radical, and morpholine radical.

As the polymerize-able olefin compound from which the unit expressed by the foregoing formula (4) is derived, there can be mentioned the alpha, beta-unsaturated acids such, for example, as acrylic acid and methacrylic acid; the alkyl esters of these alpha, beta-unsaturated acids; cyclohexyl ester or lower alkyl substituted cyclohexyl ester of the foregoing alpha, beta-unsaturated acids; the $C_1$-$C_4$ hydroxyalkyl esters of the alpha, beta-unsaturated acids such as the 2-hydroxyethyl esters, 2-hydroxypropyl ester and 2-hydroxybutyl ester of the foregoing alpha, beta-unsaturated acids; the amides or alkyl amides of the foregoing alpha, beta-unsaturated acids such as acrylamide, methacrylamide, acryl- or methacrylamide, acryl- or methacryl dimethylamide, acryl- or methacryl-N,N-dimethylaminopropylamide, acryl- or methacryl-morpholineamide; the $C_1$-$C_8$ aminoalkyl esters of the aforesaid alpha, beta-unsaturated acids; the $C_1$-$C_8$ dialkylaminoalkyl esters of the aforesaid alpha, beta-unsaturated acids; the glycidyl esters of the foregoing alpha, beta-unsaturated acids; the tetrahydrofurfuryl esters of the aforesaid alpha, beta-unsaturated acids; the benzyl esters of the foregoing alpha, beta-unsaturated acids; the polyethylene glycol monoesters such as the diethylene glycol, triethylene glycol and tetraethylene glycol monoesters of the aforesaid alpha, beta-unsaturated acids; the nitriles of the foregoing alpha, beta-unsaturated acids such as acrylonitrile and methacrylonitrile; vinyl alcohol, methylvinyl alcohol and dimethylvinyl alcohol; the $C_2$-$C_8$ alkyl esters of vinyl alcohol or the foregoing methyl-substituted vinyl alcohols such as vinyl acetate, vinyl propionate and vinyl butylate; styrene; alpha-methylstyrene and vinyl toluene; vinylpyridine; vinylpyrrolidone; and vinylmethylpyrrolidone. The cationic graft-co-polymer of this invention consisting essentially of the water-soluble liner polymer cationic derivative units of the above formulae (1), (2), or (3) and the polymerized olefin compound units of the above formulae (4) wherein k is an integer of 10 to 200,000 usually can be obtained by reacting the cationic derivative of the water-soluble linear polymer having a hydroxyl groups with a polymerize-able olefin monomer in the presence of a red-ox initiator in the absence of molecular oxygen in a water. If desired, the use of the catalyst compound may be omitted, and the materials may be heat-polymerized under suspending or emulsifying conditions. Furthermore, it is also possible to polymerize the materials in solution by applying actinic radiation such as gamma-rays, X-rays, electron rays or ultraviolet rays.

Representative of red-ox initiators are a tetravalent cerium compounds. An intermediate complex between $Ce^{4+}$ ion and a hydroxyl group of the backbone polymer is formed and the oxidation-reduction proceeds via free radicals, capable of initiating vinyl polymerization. At this time, the presence of molecular oxygen reduces the activity of the red-ox initiator, and therefore, the reaction is desirably carried out after purging the reaction solution with nitrogen. The pH of the reaction system is not more than 6, preferably not more than 3 under acidic conditions. Examples of such a cerium compound are cerium ammonium nitrate, cerium sulfate, cerium ammonium sulfate, cerium nitrate, and cerium ammonium pyrophosphate. The reaction can be performed at room temperature, and temperature within a range of 0° C. to 80° C. are generally employed. When the initiator is utilized, the concentrations of the backbone polymer (the cationic derivative of the water-soluble linear polymer which is used in this invention), the polymerize-able olefin monomer and the initiator based on the total volume of the reaction system can be varied freely. For example, the preferred DEAE(2-diethylaminoethy)-dextran hydrochloride concentration is 0.5 to 25 wt/vol %, the concentration of the methylmethacrylate 1 to 35 wt/vol %, and the cerium initiator concentration $5.5 \times 10^{-3}$ to $11 \times 10^{-1}$ mol/liter. The resulted latex of the cationic graft-copolymer can be purified to remove the residual monomer and the initiator by dialysis and reverse osmotic. Where the red-ox initiator is used, it may be deactivated after reaction by using a deactivating agent such as hydroquinone, sodium sulfate or ferrous sulfate. When a cationic graft-copolymer is wanted itself, the reaction product is precipitated using an alcohol. The by-product homopolymer may be removed with a suitable solvent such as acetone, tetrahydrofuran, dimethyl formamide, ethyl acetate or chloroform. The cationic graft-copolymer so obtained is useful as a micro carrier for cell cultivation when it conforms to the following conditions:

1. The particles of the graft-copolymer can fall smoothly when stationary.
2. The particles of the graft-copolymer can float smoothly when stirred.

The particles of the graft-copolymer of this invention, of course, possess cationic properties. These make it useful as a micro-carrier for cell cultivation.

It has been also recently discovered that the resulting latex of the cationic graft-copolymer under these conditions is superior to other high efficiency transfection reagent vectors for cells, particularly for mammalian cells.

This invention is of a new class of polycationic transfection reagents based on reacting the cationic derivative of the water-soluble linear polymer having hydroxyl groups with a polymerizable olefin monomer in the presence of a red-ox initiator. The specifically designed molecular structure of the cationic graft-copolymer having a hydrophilic-hydrophobic micro-separated-domain ensures easy entry of DNA or RNA into cells (i.e. transfection) by condensing DNA or RNA to compact structures (graft-copolymer/DNA-complex or transfection-complex) and endosome buffering. The high efficiency of the graft-copolymer makes it a valuable tool for gene delivery or gene transfer experiments.

These gene delivery systems consist of an elementary step of formation of the complex between the cationic graft-copolymer so obtained and nucleic acids, such as DNA or RNA.

The complex between the cationic graft-copolymer of this invention and nucleic acids, such as DNA or RNA, consist essentially of the water-soluble liner polymer cationic derivative units of formulae (1), (2), or (3), the polymerized olefin compound units of formula (4), and nucleic acids, such as DNA or RNA, of formulae (5) or (6), as a recurring unit.

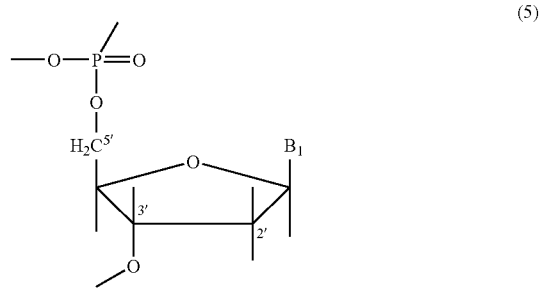

(5)

Where $B_1$ is a base selected from the group of adenine, thymine, guanine, and cytosine.

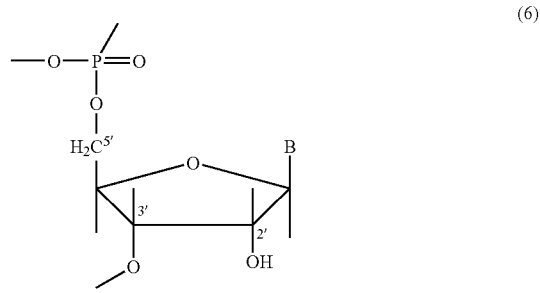

(6)

Where B is a base selected from the group of adenine, uracil, guanine, and cytosine.

Protocol for the cationic graft-copolymer of this invention for transfection of monolayer cells is a modification of the protocol by Al-Moslih and Dubes (1973, J. Gen. Virol. 18. 189), as described below:

Protocol A
1. Prepare cells by plating the day before transfection.
2. Prepare the wash solution (1×PBS(phosphate-buffered saline)). Warm the wash solution and cationic graft-copolymer to 37° C.
3. Using the 10×PBS supplied, dilute to a 1× solution. Prepare transfection solutions as outlined below (for 100-mm plates): In a sterile tube, dilute 20 μg of DNA (plasmid corded Luciferase activity) to 540 μl in 1×PBS. Add 28 μl of the cationic graft-copolymer having a starting polycation concentration of 10 mg/ml to the DNA solution. Tap the tube to mix.
4. Remove culture medium from the cells. Wash cells twice with 2×10 ml per 100-mm plate.
5. Add the mixture of DNA or RNA and cationic graft-copolymer to cells. Swirl plate to distribute.
6. Incubate plates at 37° C. for 30 minutes with occasional agitation.
7. Gently add 6 ml of growth medium per 100-mm plate. Incubate for 2.5 hours or until cytotoxicity is apparent. Change medium. Cells are generally ready to harvest at 48-72 hours post-transfection and can then be assayed for luciferase activity.
8. Luciferase activity is determined using a Luciferase assay kit (Promega, Madison, Wis.) and a Turner model TD-20e luminometer, with luciferase activity being reported in Turner light units (TLU). Cells are lyzed in the culture plate wells with 200 μl of lysis buffer per well and the cell lysates are transferred to microfuge tubes. Cell lysates are centrifuged to pellet the insoluble cellular debris and 20 μl aliquots of the cell lysates are assayed in 100 μl of luciferase reaction reagent per condition for luciferase activity. The results of each transfection in this specification represents the mean of three individual transfections. Maximum luciferase expression within each experiment is usually set at 1.0, but in this patent the luciferase expression of DEAE-dextran used in Example 1 was set at 1.0.

Approximation of TLU was performed by assaying serial dilutions of recombinant luciferase (cat. #E170A, Promega, Madison, Wis.), as recommended by the supplier.

Protocol B
1. Prepare cells by plating the day before transfection.
2. Prepare the wash solution (either 1×PBS or 1×HBSS) Warm the wash solution and cationic graft-copolymer 37° C.
3. Using the 10×PBS supplied, dilute to a 1× solution. Prepare transfection solutions as outlined below (for 35-mm plates): In a sterile tube, dilute 10 μg of DNA in 270 μl of 1×PBS. Add 14 μl of the cationic graft-copolymer having a starting polycation concentration of 10 mg/ml to the DNA solution. Tap the tube to mix
4. Remove culture medium from the cells. Wash cells twice with 2×2.0 ml per 35-mm plate.
5. Add the DNA/cationic graft-copolymer mixture to cells. Swirl plate to distribute.
6. Incubate plates at 37° C. for 30 minutes with occasional agitation.
7. Gently add 3.0 ml of growth medium per 35-mm plate. Incubate for 2.5 hours or until cytotoxicity is apparent. Change medium. Cells are generally ready to harvest 50 hours post-transfection and can then be assayed for transfection activity.

In the case of DEAE-dextran-MMA-Copolymer (Example 1), transfection of a monolayer of cos-1 cells (kidney cells of an African green monkey) transfected by SV40 was carried out by adding autoclaved DEAE-dextran-MMA Copolymer solution to the diluted plasmid solution (pGL3-control corded Luciferase activity (Promega)) and mixed following Protocol A. For Example 2, cells were ready to harvest 50 hours post-transfection and were then assayed for luciferase activity. Luciferase expression of the DEAE-dextran-MMA-Copolymer in Example 2 was 5.0, which was superior to the 1.0 of the starting DEAE-dextran.

DEAE-dextran-MMA-Copolymer transfection of cells in Example 2 was carried out using the steps below:
(a) Formation of a complex between DNA and DEAE-dextran-MMA-Copolymer.
(b) Uptake.
(c) Endosytosis (endosome).
(d) Escape from endsytic vesicle.
(e) DNA release in cytosol.
(f) Nuclear entry.
(g) DNA release and transcription in nucleus.

For transfection efficiency, it is very important to examine factors such as Uptake in step (b), Resistance of nuclease in step (c), Escape from endsytic vesicle in step (d), Nuclear targeting in step (f), and DNA release in step (g). The positively charged diethylaminoethyl(DEAE)-dextran copolymer interacts with the negatively charged phosphate backbone of DNA.

The resulting complex in step (a) is absorbed into cells by endocytosis.

The specifically designed molecular structure of DEAE-dextran-MMA-Copolymer having a positive charge and a hydrophilic-hydrophobic micro-separated-domain ensures easy entry of DNA or RNA into cells for steps (b), (c), (d), (f), and (g).

Formation of a complex between nucleic acids (DNA or RNA) and cationic graft-copolymers, such as DEAE-dextran-MMA copolymer, is accomplished by a coulomb force between the phosphoric acid of nucleic acids and the Diethylamino-ethyl(DEAE) group of DEAE-dextran. The obtained complex was insoluble in water, which is a good solvent for nucleic acids. These results show that the complex between nucleic acids (DNA or RNA) and DEAE-dextran-MMA-copolymer must form a Poly-ion complex. The complex between nucleic acids (DNA or RNA) and the Cationic graft-copolymer of this invention must typically form a Poly-ion complex. In the case of Example 3, a complex between DNA and DEAE-dextran-MMA-copolymer hydrochloride having a 200% of grafting rate needed 0.4 hours to precipitate.

The complex between DNA and DEAE-dextran-MMA-copolymer hydrochloride having 300% and 150% weight increases needed 0.5 hours and 2 hours to precipitate, respectively.

However, a complex between DNA and DEAE-dextran hydrochloride needed 96 hours to precipitate.

Samples 1, 2 and 3 were prepared following procedure of Example 1, as described below: 2 g of DEAE(2-diethylaminoethyl)-Dextran hydrochloride (nitrogen content 3%) derived from Dextran having a weight average molecular weight of 500,000 was dissolved in 100 ml of water, and then 3 ml, 4 ml or 6 ml of methyl methacrylate (MMA), for Samples 1, 2 and 3, respectively, was added. With stirring, the air in the reaction vessel was fully replaced with nitrogen gas. To the solution was added 0.1 g of ceric ammonium nitrate and 15 ml. of 0.1 N nitric acid, and the mixture was reacted with stirring for 1 hour at 30° C. Then, 3 ml of a 1% aqueous solution of hydroquinone was added to stop the reaction, and the resulting latex of DEAE-dextran-MMA copolymer was purified by water dialysis using a cellophane tube in order to remove the uni-reacted MMA, ceric salts, and nitric acid. The resulting latex of DEAE-dextran-MMA copolymer was stable and soap-less. According to Example 3, to 1 ml of a 20 mg/ml of a DNA(EX Salmon Sperm) solution, 2 ml of a 10 mg/ml (as DEAE-dextran) solution of the resulting latex of DEAE-dextran-MMA copolymer was added dropwise in order to obtain the DEAE-dextran-MMA copolymer-DNA complex.

In these Examples, a complex of sample 1 between DNA and DEAE-dextran-MMA-Copolymer hydrochloride having a 150% weight increase was formed in 2 hours. A complex of sample 2 and sample 3 between DNA and DEAE-Dextran-MMA-copolymer hydrochloride having a 200% and 300% weight increase were formed in 1 hour and 0.5 hours, respectively.

However, a complex between DNA and DEAE-dextran hydrochloride was formed in 96 hours. Following transfection protocol B, transfection of the primary human embryonic kidney cells 293 (HEK 293) by sample 1 and sample 2 was carried out using DNA (PCMV-β-gal plasmid(Invitrogen)).

With the transfection efficiency, transfection activity was determined using the X-gal Staining (β-galactosidase activities in tissue) method and a value 3 times higher was confirmed for sample 1 and sample 2 than for the starting DEAE-dextran hydrochloride.

EXAMPLE 1

2 g of DEAE(2-diethylaminoethyl)-dextran hydrochloride (nitrogen content 5%) derived from dextran having a weight average molecular weight of 500,000 was dissolved in 50 ml. of water, and then 8 ml. of methyl methacrylate (MMA) was added. With stirring, the air in the reaction vessel was fully replaced with nitrogen gas. To the solution were added 0.1 g of ceric ammonium nitrate and 15 ml. of 0.1N nitric acid, and the mixture was reacted with stirring for 1 hour at 30° C. Then, 3 ml. of a 1% aqueous solution of hydroquinone was added to stop the reaction. The reaction mixture was poured into methanol to form a precipitate. The precipitate formed was washed with hot water, centrifuged, and dried at 50° C. under reduced pressure. The crude DEAE-dextran-MMA copolymer so obtained was placed in a Soxhlet extractor, and extracted for 24 hours continuously using acetone, to afford 1.5 g of a purified DEAE-dextran-MMA copolymer. The yield of DEAE-dextran was 25%, the nitrogen content was 1.7%, and the grafting (%) was 200%. The grafting (%) is expressed by the following equation.

Grafting (%)=(weight of MMA graft-polymerized/ weight of DEAE-dextran hydrochloride in the copolymer)×100

The resulted DEAE-dextran-MMA copolymer is insoluble in water and acetone at 25° C. In view of the fact that DEAE-dextran hydrochloride is soluble in water and poly(MMA) is soluble in acetone, it is evident that the DEAE-dextran-MMA copolymer is not a mixture of DEAE-dextran and poly(MMA).

The infrared absorption spectrum of the copolymer has some characteristic absorption bands at 1730 cm$^{-1}$ and at 1000 to 1150 cm$^{-1}$, which is attributed to the carbonyl group of poly(MMA) and the pyranose ring of DEAE-dextran, respectively. Thus, the resulting DEAE-dextran-MMA copolymer exhibits different solubility from DEAE-dextran and poly(MMA) and shows the above-described characteristic absorption in infrared absorption spectrum. From this fact, it is judged that the resulting DEAE-dextran-MMA copolymer is a compound graft-polymerized.

EXAMPLE 2

The procedure of Example 1 was repeated till stopping the reaction by adding 3 ml. of a 1% aqueous solution of hydroquinone, and then the resulted latex of DEAE-dextran-MMA copolymer was purified to remove the unreacted MMA, ceric salts, and nitric acid to be done a water dialysis by using cellophane tube. The resulted latex of DEAE-dextran-MMA copolymer was stable and soap-less.

According to the procedure of the Protocol A for the cationic copolymer, a transfection for COS-1 cell was carried out using the resulted latex of DEAE-dextran-MMA copolymer in comparison with the one of the source DEAE-dextran hydrochloride. With the transfection effect using a luciferase activity, DEAE-dextran-MMA copolymer has 5 times higher value than the starting DEAE-dextran hydrochloride of Example 1.

EXAMPLE 3

To 1 ml of a 20 mg/ml of a DNA(EX Salmon Sperm) solution, 2 ml of a 10 mg/ml (as DEAE-dextran) solution of the resulting latex of DEAE-dextran-MMA copolymer of Example 2 was added dropwise to obtain 20 mg of the DEAE-dextran-MMA copolymer-DNA complex.

It took 0.4 hours for the complex to precipitate, but 96 hours for the DEAE-dextran-DNA complex. FIG. 1 shows the infrared absorption spectra of the resulting complex between DEAE-dextran-MMA copolymer and DNA. The spectrum of the complex has some characteristic absorption bands at 1730 cm$^{-1}$, 1220 cm$^{-1}$, and at 1000 to 1150 cm$^{-1}$, which is attributed to the carbonyl group of poly(MMA), P—O stretching vibration of DNA, and the pyranose ring of DEAE-dextran, respectively.

EXAMPLE 4

To 1 ml of a 10 mg/ml of a RNA(EX, East) solution, 2 ml of a 10 mg/ml (as DEAE-dextran) solution of the resulting latex of DEAE-dextran-MMA copolymer of Example 2 was added dropwise to obtain 10 mg of the DEAE-dextran-MMA copolymer-RNA complex.

Figure 2:
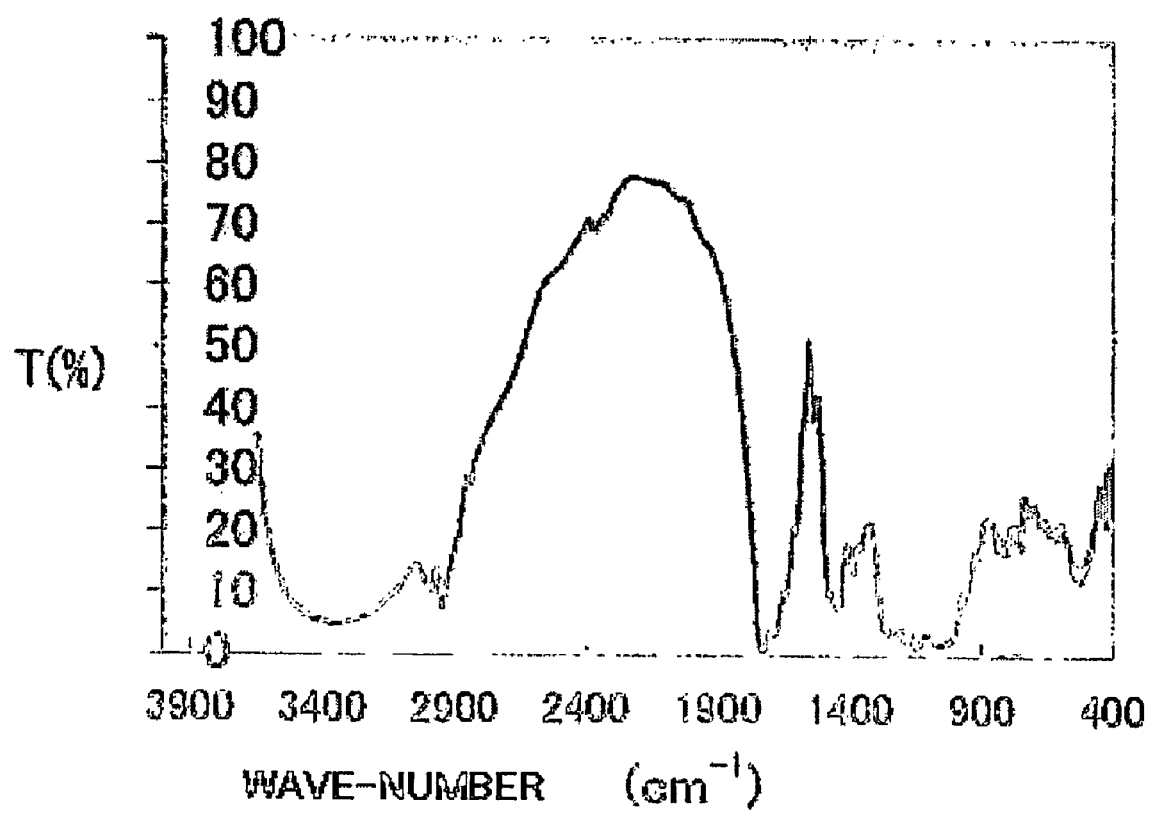
FIG. 2 is a diagram showing the infrared absorption spectra of the complex between the DEAE(2-diethylaminoethyl)-dextran-methyl methacrylate graft copolymer and RNA according to Example 4 of this invention.

It took 4 hours for the complex to precipitate, but 144 hours for the DEAE-dextran-RNA complex. FIG. 2 shows the infrared absorption spectra of the resulting complex between DEAE-dextran-MMA copolymer and RNA. The spectrum of the complex has some characteristic absorption bands at 1730 cm$^{-1}$, 1230 cm$^{-1}$, and at 1000 to 1150 cm$^{-1}$, which is attributed to the carbonyl group of poly(MMA), P—O stretching vibration of RNA, and the pyranose ring of DEAE-dextran, respectively.

EXAMPLE 5

Examples 1 was repeated except that 2 g of TEAE(triethylaminoethyl)-dextan hydrochloride (nitrogen content 2%) derived from dextran having a weight average molecular weight of 300,000, 15 ml. of methyl acrylate (MA), 10 ml of methanol, and 0.25 g of ceric ammonium nitrate were used, and 2 g of a purified TEAE-dextan-MA copolymer was obtained. The yield of TEAE-dextran was 35%, the nitrogen content was 0.7%, and the grafting(%) was 185%. The resulted TEAE-dextran-MA copolymer is insoluble in water and acetone at 25° C.

EXAMPLE 6

The procedure of Example 2 was repeated with TEAE-dextran-MA copolymer of Example 5 to result the latex of TEAE-dextran-MA copolymer. According to the procedure of Example 2, a transfection for COS-1 cell was carried out.

With the transfection effect using a luciferase activity, TEAE-dextran-MA copolymer has 3 times higher value than the starting DEAE-dextran hydrochloride of Example 1.

EXAMPLE 7

The procedure of Example 3 was repeated with TEAE-dextran-MA copolymer of Example 6 in order to result the complex between TEAE-dextran-MA copolymer and DNA (EX, Salmon Sperm).

The 15 mg of TEAE-dextran-MA copolymer-DNA complex was obtained.

It took 3 hours for the complex to precipitate.

EXAMPLE 8

The procedure of Example 4 was repeated with TEAE-dextran-MA copolymer of Example 6 in order to result the complex between TEAE-dextran-MA copolymer and RNA (EX, East).

The 8 mg of TEAE-dextran-MA copolymer-RNA complex was obtained.

It took 5 hours for the complex to precipitate.

EXAMPLE 9

Example 1 was repeated except that 2 g of TEAE(triethylaminoethyl)-polyvinylalcohol (PVA) hydrochloride (nitrogen content 2%) derived from PVA having a weight average molecular weight of 300,000 was used, and 2 g of a purified TEAE-PVA-MA copolymer was obtained. The yield of TEAE-PVA was 33%, the nitrogen content was 0.67%, and the grafting (%) was 200%. The resulted TEAE-PVA-MA copolymer is insoluble in water and acetone at 25° C.

EXAMPLE 10

The procedure of Example 2 was repeated with TEAE-PVA-MA copolymer of Example 9 to result the latex of TEAE-PVA-MA copolymer. According to the procedure of Example 2, a transfection for COS-1 cell was carried out.

With the transfection effect using a luciferase activity, TEAE-PVA-MA copolymer has 2 times higher value than the starting DEAE-dextran hydrochloride of Example 1.

EXAMPLE 11

The procedure of Example 3 was repeated with TEAE-PVA-MA copolymer of Example 10 in order to result the complex between TEAE-PVA-MA copolymer and DNA(EX, Salmon Sperm).

The 10 mg of TEAE-PVA-MA copolymer-DNA complex was obtained.

It took 2 hours for the complex to precipitate.

EXAMPLE 12

The procedure of Example 4 was repeated with TEAE-PVA-MA copolymer of Example 10 in order to result the complex between TEAE-PVA-MA copolymer and RNA(EX, East).

The 7 mg of TEAE-PVA-MA copolymer-RNA complex was obtained.

It took 4 hours for the complex to precipitate.

EXAMPLE 13

Example 1 was repeated, except that 4 g of DEAE(2-diethylaminoethyl)-pullulan hydrochloride (nitrogen content 4%) derived from a pullulan having a weight average molecular weight of 200,000, 80 ml. of water, 35 ml. of purified styrene monomer, 10 ml. of methanol, 30 ml. of 0.1N nitric acid, 0.2 g of ceric ammonium nitrate, and tetrahydrofuran for a Soxhlet extract were used, to afford 6 g of a purified DEAE-pullulan-styrene copolymer. The yield of DEAE-pullulan was 43%, the nitrogen content was 1.14%, and the grafting (%) was 250%. The resulted DEAE-pullulan-styrene copolymer is insoluble in water and tetrahydrofuran.

EXAMPLE 14

The procedure of Example 2 was repeated with DEAE-pullulan-styrene copolymer of Example 13 to result the latex of DEAE-pullulan-styrene copolymer. According to the procedure of Example 2, a transfection for COS-1 cell was carried out.

With the transfection effect using a luciferase activity, DEAE-pullulan-styrene copolymer has 1.5 times higher value than the starting DEAE-dextran hydrochloride of Example 1.

EXAMPLE 15

The procedure of Example 3 was repeated with DEAE-pullulan-styrene copolymer of Example 14 in order to result the complex between DEAE-pullulan-styrene copolymer and DNA(EX, Salmon Sperm). The 12 mg of DEAE-pullulan-styrene copolymer-DNA complex was obtained.

It took 2.5 hours for the complex to precipitate.

EXAMPLE 16

The procedure of Example 4 was repeated with DEAE-pullulan-styrene copolymer of Example 14 in order to result the complex between DEAE-pullulan-styrene copolymer and RNA(EX, east).

The 9 mg of DEAE-pullulan-styrene copolymer-R NA complex was obtained.

It took 5 hours for the complex to precipitate.

EXAMPLE 17

Example 1 was repeated, except that 4 g of AE(aminoethyl)-dextran hydrochloride (nitrogen content 5%) derived from dextran having a weight average molecular weight of 40,000, 90 ml. of water, 20 ml. of butyl methacrylate (BMA), and 0.15 g of ceric ammonium nitrate, to afford 6 g of a purified AE-dextran-BMA copolymer. The yield of AE-dextran was 60%, the nitrogen content was 2%, and the grafting (%) was 150%. The resulted AE-dextran-BMA copolymer is insoluble in water and acetone.

EXAMPLE 18

The procedure of Example 2 was repeated with AE-dextran-BMA copolymer of Example 17 to result the latex of AE-dextran-BMA copolymer. According to the procedure of Example 2, a transfection for COS-1 cell was carried out.

With the transfection effect using a luciferase activity, AE-dextran-BMA copolymer has 1.5 times higher value than the starting DEAE-dextran hydrochloride of Example 1.

EXAMPLE 19

The procedure of Example 3 was repeated with AE-dextran-BMA copolymer of Example 18 in order to result the complex between AE-dextran-BMA copolymer and DNA (EX, Salmon Sperm).

The 12 mg of AE-dextran-BMA copolymer-DNA complex was obtained.

It took 3 hours for the complex to precipitate.

EXAMPLE 20

The procedure of Example 4 was repeated with AE-dextran-BMA copolymer of Example 18 to result the complex between AE-dextran-BMA copolymer and RNA(EX, east).

The 10 mg of DEAE-pullulan-styrene copolymer-RNA complex was obtained.

It took 5 hours for the complex to precipitate.

EXAMPLE 21

Example 1 was repeated, except that 4 g of HPTMA(2-hydroxypropyltrimethylammonium)-pullulan hydrochloride (nitrogen content 3%) derived from pullulan having a weight average molecular weight of 30,000, 100 ml. of water, 30 ml. of methyl acrylate (MA), 20 ml. of 0.1N nitric acid, 0.2 g of ceric ammonium nitrate, 4 ml. of a 1% aqueous solution of hydroquinone, and not 5 ml. of methanol were used, to afford 2 g of a purified HPTMA-pullulan-MA copolymer. The yield of HPTMA-pullulan was 33%, the nitrogen content was 2%, and the grafting (%) was 50%. The resulted HPTMA-pullulan-MA copolymer is insoluble in water and acetone.

EXAMPLE 22

The procedure of Example 2 was repeated with HPTMA-pullulan-MA copolymer of Example 21 to result the latex of HPTMA-pullulan-MA copolymer. According to the procedure of Example 2, a transfection for COS-1 cell was carried out.

With the transfection effect using a luciferase activity, HPTMA-pullulan-MA copolymer has 1.1 times higher value than the starting DEAE-dextran hydrochloride of Example 1.

EXAMPLE 23

The procedure of Example 3 was repeated with HPTMA-pullulan-MA copolymer of Example 22 in order to result the complex between HPTMA-pullulan-MA copolymer and DNA(EX, Salmon Sperm). The 10 mg of HPTMA-pullulan-MA copolymer-DNA complex was obtained. It took 5 hours for the complex to precipitate.

EXAMPLE 24

The procedure of Example 4 was repeated with HPTMA-pullulan-MA copolymer of Example 22 in order to result the complex between HPTMA-pullulan-MA copolymer and RNA(EX, east).

The 9 mg of HPTMA-pullulan-MA copolymer-RNA complex was obtained. It took 6 hours for the complex to precipitate.

INDUSTRIAL APPLICABILITY

The cationic copolymers of this invention have superior properties for non-viral gene delivery when compared with other non-viral vectors owing to their industrially applicable properties, such as inexpensive price, biological safety, stability, and the ability to mass produce them.

Due to their stability, it is possible to autoclave at 120° C. for 15 minutes for sterilization.

These properties are suitable for industrial production.

What is claimed is:

1. A complex between a cationic graft-copolymer of a water-soluble linear backbone polymer having hydroxyl groups and DNA, comprising a unit derived from a cationic water-soluble linear polysaccharide of the following formula (1)

$$[C_6H_7O_2(OH)_{3-a}(OX)_a]_x H_2O \qquad (1)$$

or a unit derived from a water-soluble linear polyvinylalcohol of the following formula (2) or a partial hydrolyzed alcohol of the following formula (3)

$$—[CH_2CH(OH)_{1-b}(OX)_b]_n— \qquad (2)$$

$$—[CH_2CH(OH)_{1-b-c}(OX)_b(OAc)_c]_n— \qquad (3)$$

wherein X is a —$(CH_2)_m R_1$ organic radical where $R_1$ is a member of the class consisting of:

—$NH_3^+$ radical,
—$NH^+(CH_3)_2$ radical,
—$NH^+(C_2H_5)_2$ radical,
—$N^+(C_2H_5)_3$ radical,
—$N^+(CH_2)_2CH_2CH(OH)CH_3$ radical,
—$N^+(C_2H_5)_2CH_2CH(OH)CH_3$ radical,
—$N^+(C_2H_5)_2(C_2H_5)N(C_2H_5)_2$ radical,
—$C_6H_4NH_3^+$ radical,
—$COC_6H_4NH_3^+$ radical,
—$COR_2$ radical where $R_2$ is —$CH_2NH_3^+$ or —$C_6H_4NH_3^+$, and
—$CH_2CH(OH)CH_2R_3$ radical where $R_3$ is —$NH_3^+$, —$NH^+(CH_3)_2$, —$NH^+(C_2H_5)_2$, or —$N^+(C_2H_5)_3$ radical, where m is a natural number of 1 to 3, a is a positive number having a value of 0<a<3, b is a positive number having a value of 0<b<1, x and n are natural numbers having a value of 5 or more, 1>b+c, and Ac is acetyl radical;

a unit derived from a polymerize-able olefin compound of the following formula (4)

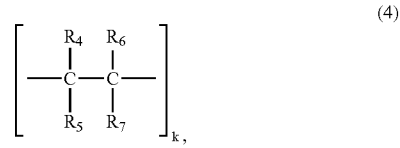

(4)

wherein $R_4$, $R_5$ and $R_6$ are each selected from the group consisting of hydrogen and $CH_3$ and $R_7$ is a member of the group consisting of:

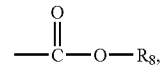

where $R_8$ is a member of the class consisting of hydrogen, $C_1$-$C_{12}$ alkyl radicals, cyclohexyl radical, $C_1$-$C_4$ hydroxyalkyl radicals, $C_1$-$C_8$ aminoalkyl radicals, $C_1$-$C_8$ dialkylaminoalkyl radicals, glycidyl radical, tetrahydrofuran radical, $C_1$-$C_4$ lower alkyl-substituted tetrahydrofuran radical, benzyl radical, a $(CH_2CH_2O)_y CH_2CH_2OH$ radical where y is a positive integer from 1 to 10, and —$N(R_9)_2$ where the two $R_9$'s which may be the same or different, are either hydrogen or a $C_1$-$C_4$ alkyl radical;

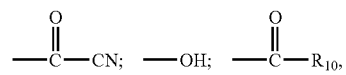

where $R_{10}$ is a $C_1$-$C_8$ alkyl radical, phenyl radical, tolyl radical, pyridine radical, pyrrolidone radical; and

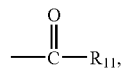

where $R_{11}$ is $NH_2$, $NHCH_3$, N,N-dimethylamino radical, N,N-dimethylaminopropylamino radical, and morpholine radical; and a unit derived from a poly(deoxyribonucleotide) of the following formula (5) as a recurring unit:

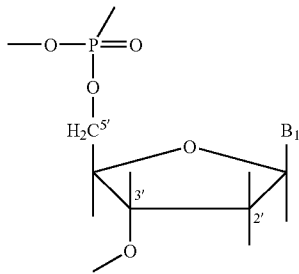

(5)

where $B_1$ is a base selected from the group of adenine, thymine, guanine, and cytosine.

2. A gene delivery system using the complex between the cationic graft-copolymer and DNA of claim 1.

3. A complex between a cationic graft-copolymer of a water-soluble linear backbone polymer having hydroxyl groups and RNA, comprising a unit derived from a cationic water-soluble linear polysaccharide of the following formula (1)

$$[C_6H_7O_2(OH)_{3-a}(OX)_a]_x H_2O \quad (1)$$

or a unit derived from a water-soluble linear polyvinylalcohol of the following formula (2) or a partial hydrolyzed alcohol of the following formula (3)

$$-[CH_2CH(OH)_{1-b}(OX)_b]_n- \quad (2)$$

$$-[CH_2CH(OH)_{1-b-c}(OX)_b(OAc)_c]_n- \quad (3)$$

wherein X is a $-(CH_2)_m R_1$ organic radical where $R_1$ is a member of the class consisting of:
- $-NH_3^+$ radical,
- $-NH^+(CH_3)_2$ radical,
- $-NH^+(C_2H_5)_2$ radical,
- $-N^+(C_2H_5)_3$ radical,
- $-N^+(CH_2)_2CH_2CH(OH)CH_3$ radical,
- $-N^+(C_2H_5)_2CH_2CH(OH)CH_3$ radical,
- $-N^+(C_2H_5)_2(C_2H_5)N(C_2H_5)_2$ radical,
- $-C_6H_4NH_3^+$ radical,
- $-COC_6H_4NH_3^+$ radical,
- $-COR_2$ radical where $R_2$ is $-CH_2NH_3^+$ or $-C_6H_4NH_3^+$, and
- $-CH_2CH(OH)CH_2R_3$ radical where $R_3$ is $-NH_3^+$, $-NH^+(CH_3)_2$, $-NH^+(C_2H_5)_2$, or $-N^+(C_2H_5)_3$ radical, where m is a natural number of 1 to 3, a is a positive number having a value of 0<a<3, b is a positive number having a value of 0<b<1, x and n are natural numbers having a value of 5 or more, 1>b+c, and Ac is acetyl radical;

a unit derived from a polymerize-able olefin compound of the following formula (4)

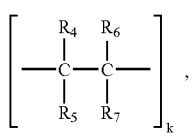

(4)

wherein $R_4$, $R_5$ and $R_6$ are each selected from the group consisting of hydrogen and $CH_3$ and $R_7$ is a member of the group consisting of:

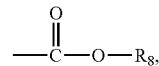

where $R_8$ is a member of the class consisting of hydrogen, $C_1$-$C_{12}$ alkyl radicals, cyclohexyl radical, $C_1$-$C_4$ hydroxyalkyl radicals, $C_1$-$C_8$ aminoalkyl radicals, $C_1$-$C_8$ dialkylaminoalkyl radicals, glycidyl radical, tetrahydrofuran radical, $C_1$-$C_4$ lower alkyl-substituted tetrahydrofuran radical, benzyl radical, a $(CH_2CH_2O)_y CH_2CH_2OH$ radical where y is a positive integer from 1 to 10, and $-N(R_9)_2$ where the two $R_9$'s which may be the same or different, are either hydrogen or a $C_1$-$C_4$ alkyl radical;

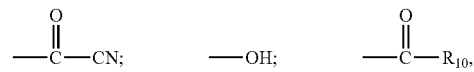

where $R_{10}$ is a $C_1$-$C_8$ alkyl radical, phenyl radical, tolyl radical, pyridine radical, pyrrolidone radical; and

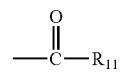

where $R_{11}$ is $NH_2$, $NHCH_3$, N,N-dimethylamino radical, N,N-dimethylaminopropylamino radical, and morpholine radical; and a unit derived from a poly(ribonucleotide) of the following formula (6) as a recurring unit:

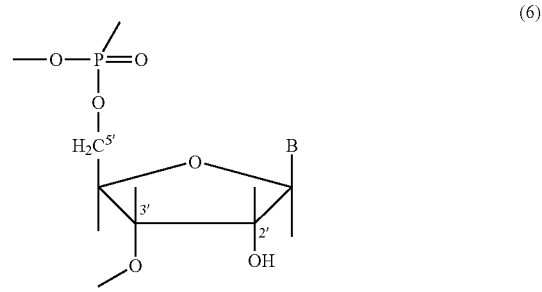

(6)

where B is a base selected from the group of adenine, uracil, guanine, and cytosine.

4. A gene delivery system using the complex between the cationic graft-copolymer and RNA claim 3.

* * * * *